Figure 1:
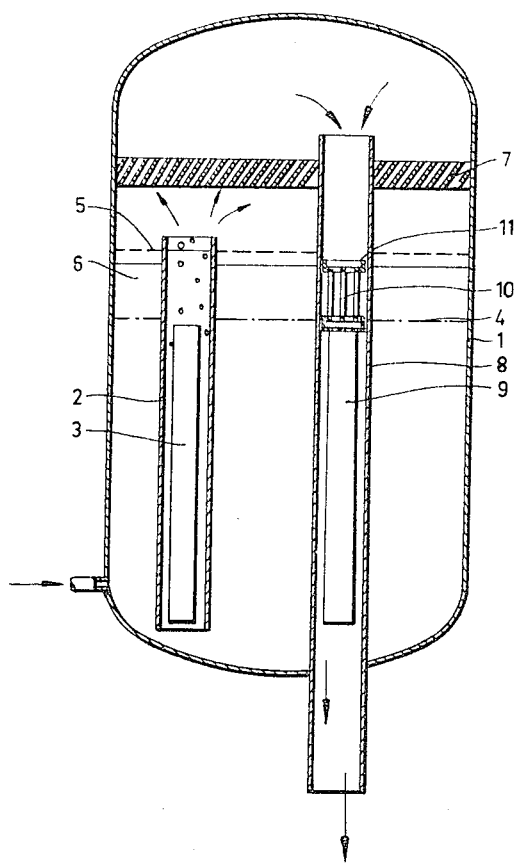

Nov. 8, 1966 M. V. STRÅÅT 3,284,310
BOILING WATER-SUPERHEAT NUCLEAR REACTOR
Filed Dec. 2, 1963 2 Sheets-Sheet 1

Inventor
Matts Valter Strååt
By Pierce, Scheffler & Parker
his Attorneys

Fig. 2
Fig. 3
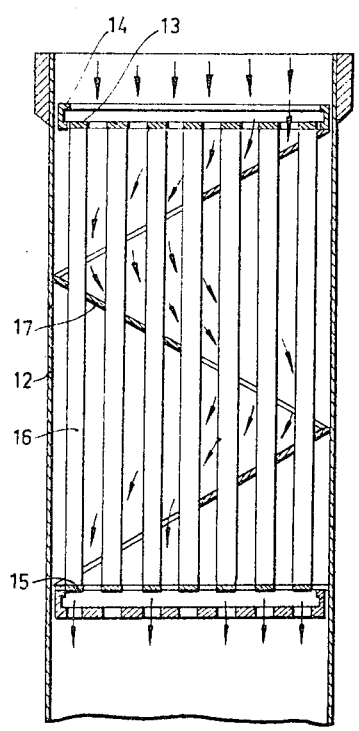
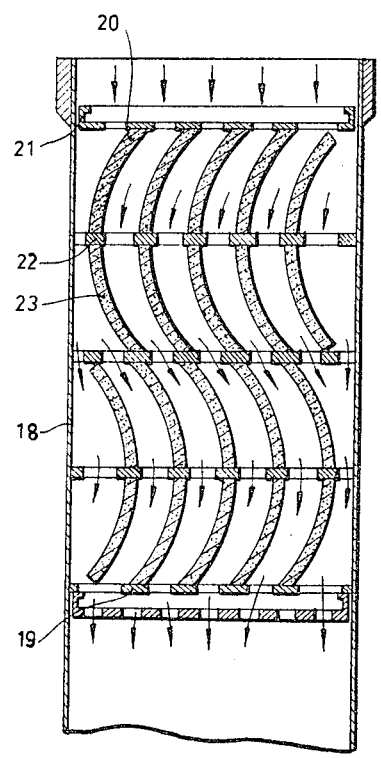

United States Patent Office 3,284,310
Patented Nov. 8, 1966

3,284,310
BOILING WATER-SUPERHEAT NUCLEAR REACTOR
Matts Valter Strååt, Saltsjöbaden, Sweden, assignor to Aktiebolaget Atomenergi, Stockholm, Sweden, a company of Sweden
Filed Dec. 2, 1963, Ser. No. 327,176
Claims priority, application Sweden, Dec. 4, 1962, 13,071/62
1 Claim. (Cl. 176—54)

This invention relates to a device for drying and pre-superheating steam in an atomic reactor intended for boiling and superheating and in which the cooling medium of the reactor also is the working medium in the turbine of a power plant. The device is particularly intended for reactors in which the fuel elements are surrounded by cooling channels but in principle it may be used also in other types of reactors. The invention comprises reactors cooled by light as well as heavy water.

Experience has shown that the moisture content of the steam supplied to the superheating section must be kept very low for avoiding damage to the material of the cladding enclosing the atomic fuel in the superheating section. If the steam contains water drops, these will be vaporized on the surfaces of the superheater, this having the effect that the small amounts of salts, for instance, chlorides, which may be present in the water, are precipitated on the surfaces of the superheater. This causes corrosion on these surfaces, the rate of corrosion being high as the surfaces of the superheater have a high temperature, for instance 150° above the temperature of the superheated steam.

In water cooled reactors with boiling and superheating therefore the steam generated in the boiling section usually is demoistened before it is passed to the superheating section of the reactor. This moisture separation may be carried out mechanically, but it may be necessary by preheating also to vaporize the remaining moisture. The heat necessary in the latter case may be taken from the superheated steam leaving the superheating section. To certainly avoid corrosion damage of the superheating elements, it is suitable not only to dry the steam but also to preheat it to at least a few degrees above the saturation temperature before supplying it to the preheating elements.

The new and characterizing feature of the nuclear reactor according to the invention is that the heating elements contain fissile material. The heating elements are placed outside of the core or so called reactor hearth proper and but so close thereto that the desired heat is generated under the influence of the leakage flux of neutrons from the reactor hearth.

The fissile material in the heating elements may be natural or enriched fuel. It may, for instance, have the shape of rods or plates, being clad in a known way, for instance, with zircaloy or stainless steel.

The heating elements may be arranged at a distance above the water level in the reactor and so that they cover the whole cross sectional area of the reactor vessel, the elements thus being flushed by the steam before the steam goes to the superheating elements. However, it is preferred to place the heating elements in the outer part of the flow tubes containing the superheating elements. The heating elements are preferably adapted to be positioned on the superheating elements in the flow tubes. So positioned the heating elements will be in the so-called reflector zone, where the neutron flux usually is 10–20% of the flux in the hearth proper. The heating elements are suitably made as replaceable units. When necessary they can be removed and cleaned.

In the following the invention will be more fully described with reference to the accompanying drawings.

FIG. 1 shows schematically, in a very simplified form a nuclear reactor according to the invention, and FIGS. 2 and 3 show two embodiments of the heating element for drying of the steam.

FIG. 1 shows a reactor vessel 1 containing a plurality of vertical flow tubes 2 for the boiling elements 3 consisting of a fissile material, the elements suitably being clad with zirconium or a zirconium alloy. The upper ends of the boiling elements lie in the horizontal plane 4, which thus defines the upper limiting surface of the core or so-called reactor hearth. As a cooling medium and moderator the reactor contains water, the level of which normally is at 5. The space 6 between the levels 4 and 5 forms the so-called reflector, which partly slows down the neutron flux from the hearth in an upward direction.

At some distance above the water level 5, a mechanical moisture separator 7 is arranged, which in a known manner may have a grid-like structure and which catches a part of the water drops carried with the steam.

A plurality of vertical flow tubes 8 extend through the reactor hearth, the upper ends of which are somewhat above the moisture separator 7, and the lower ends of which extend out through the bottom of the reactor vessel. These guide tubes 8 contain superheating elements 9, suitably clad with stainless steel. Furthermore, the guide tubes 8 contain heating elements 10 according to the invention. The heating elements 10 stand on the superheating elements 9 and are in the reflector zone. For insertion into and removal from the reactor vessel, the heating elements are provided with members 11 which are engageable by the charging machine also serving the boiling elements and the superheating elements.

The guide tubes for the superheating elements and the heating elements may have any desired position in the reactor. They may be evenly distributed in the reactor hearth, they may be arranged in the outer zone of the hearth, or they may be concentrated to a section of the hearth.

The water flows upward in the tubes 2 while boiling. The steam passes through the moisture separator 7 with a certain demoistening, and then flows downwards through the heating elements 10, where a complete demoistening and desirably also some presuperheating takes place. Then the superheating proper takes place during the passage of the steam through the superheating elements 9. Chlorides and other salts possibly present in the water will collect on the surfaces of the heating elements 10 when the water drops are vaporized on these surfaces. When necessary, the heating elements therefore are removed and cleaned.

FIG. 2 shows a heating element according to the invention inserted in the upper part of a guide tube 12. Fuel rods 16 are attached between a lower perforated plate 15 and an upper perforated plate 13 having edges 14 bent upwardly and inwardly so as to be engageable by a loading machine. The heating element contains three baffle plates 17 provided with openings so that the steam will flow in the direction of the arrows, a good contact between steam and fuel element being obtained.

The heating element according to FIG. 3 is also shown arranged in the upper part of a flow tube 18. The element consists of a lower perforated plate 19 and an upper perforated plate 20 having edges 21 engageable by a loading machine. Between these plates three perforated plates 22 are attached, which, together with the lower and upper plates serve to support a plurality of arcuately bent fuel plates 23. The arcuate shape has certain advantages in compensating the longitudinal changes in the plate caused by the temperature changes. As the direction of flow of the steam changes when passing between the fuel plates, a good contact between steam and fuel plates is obtained.

As an example a case may be taken, where the steam formed in the heating elements has a temperature of 260° C. The heating elements positioned in the reflector zone each contain 12 kg. fissile fuel, and each generates the equivalent of 40 kilowatt. Their surface temperature is 280° C. Each element has a heat-emitting surface of 52 dm.² The effect is sufficient for drying 10 kg. steam per second and preheating it about 2° C. in each element.

As already mentioned, it is preferred to have the heating elements intended for drying of the steam made as exchangeable units, for instance, positioned on top of the superheating elements proper. An advantage gained is that the heating elements are relatively easily removed for cleaning. Another advantage is that the heating elements can be used for a considerably longer time than the superheating elements, as they are burnt out considerably slower because of the lower neutron flux.

I claim:

A nuclear reactor of the boiling water type comprising a reactor vessel containing a body of water having a normal water level and a steam space above said level, a first group of substantially vertical open-ended tubes disposed in said water and wholly within said vessel, a heating element of fissile material positioned in each tube of said first group for boiling the water, said heating elements having their upper ends positioned substantially in a horizontal plane below the upper ends of said tubes of said first group, said water level being at a substantial distance above said horizontal plane but below the upper ends of said tubes of said first group, a second group of tubes in said vessel the upper ends of which extend above said water level and communicate with said steam space and the lower ends of which extend through the bottom of said vessel, an element of fissile material positioned in each of said second group of tubes with their upper ends substantially in said horizontal plane for superheating the steam, a separate heating element of fissile material in each of said second group of tubes positioned above said superheating elements and located in the zone between said horizontal plane and said water level for drying the steam before passing over each superheating element, each of said separate elements being independently removable relative to said superheating elements.

References Cited by the Examiner

UNITED STATES PATENTS

| | | | |
|---|---|---|---|
| 2,990,348 | 6/1961 | Wollan | 176—54 |
| 3,034,977 | 5/1962 | Holl et al. | 176—54 |
| 3,041,264 | 6/1962 | Ricard | 176—54 |
| 3,072,555 | 1/1963 | Barth et al. | 176—54 |
| 3,132,999 | 5/1964 | Linsenmeyer | 176—54 |

FOREIGN PATENTS

| | | |
|---|---|---|
| 204,142 | 6/1959 | Austria. |
| 1,168,933 | 9/1958 | France. |

L. DEWAYNE RUTLEDGE, *Primary Examiner.*

CARL D. QUARFORTH, *Examiner.*